Nov. 29, 1932.       G. PIRINOLI       1,889,291
FRICTION CLUTCH
Filed Sept. 23, 1931

Inventor,
Guglielmo Pirinoli
Atty's By Sommers & Young

Patented Nov. 29, 1932

1,889,291

UNITED STATES PATENT OFFICE

GUGLIELMO PIRINOLI, OF TURIN, ITALY, ASSIGNOR TO FIAT SOCIETÀ ANONIMA, OF TURIN, ITALY

FRICTION CLUTCH

Application filed September 23, 1931, Serial No. 564,656, and in Italy July 15, 1931.

In superfed internal combustion engines, the connection between the compressor and the engine shaft is generally established through a speed gear with the interposition of a friction clutch capable of transmitting a driving couple determined in such manner that any excessive objectionable forces are avoided in the transmission, said forces being generated by the considerable moments of inertia determined in sharp changes of the engine speed. This connection by a constant load friction clutch is open to several practical objections, and more particularly to excessive heating and wear of the friction clutch due to sliding of the members under heavy loads.

The object of this invention is to provide a friction clutch particularly suitable for the above use, wherein the friction between the clutch members is automatically adjusted as the engine speed varies. This affords a smooth transmission between the driving and the driven member, unaffected by considerable inertia forces in the sharp changes of speed, and in which the friction between the clutch members is automatically adjusted and varied according to the engine speed.

The friction disks of the clutch are subjected to the action of centrifugal masses, preferably in the shape of balls, carried along in rotation by the driving member and forced under the action of the centrifugal force between a wall of the driving member and an inclined surface of the pressure disk so as to tighten the friction discs and to couple the driving member with the driven member.

The driven disc is preferably provided with an external set of teeth meshing directly with a pinion keyed on the compressor shaft. By this arrangement the desired speed ratio is easily obtained without the interposition of special multiplying gears.

The accompanying drawing shows by way of example a construction of the device according to this invention.

Figure 1:
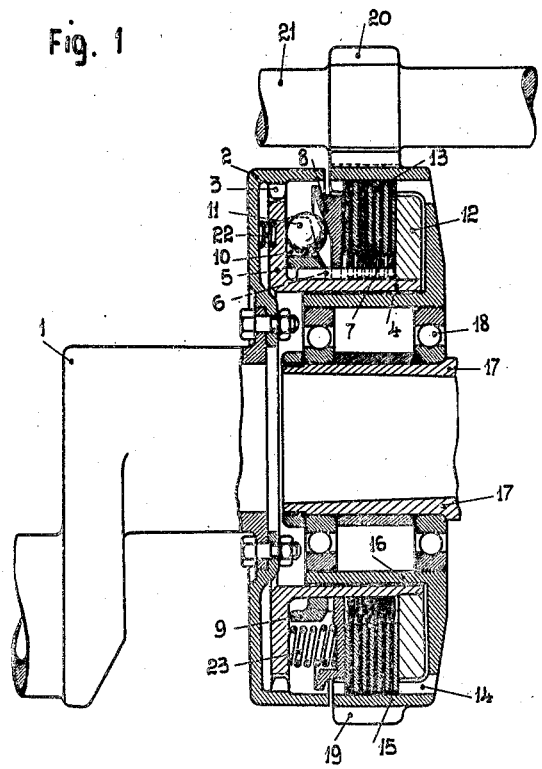
Figure 2:
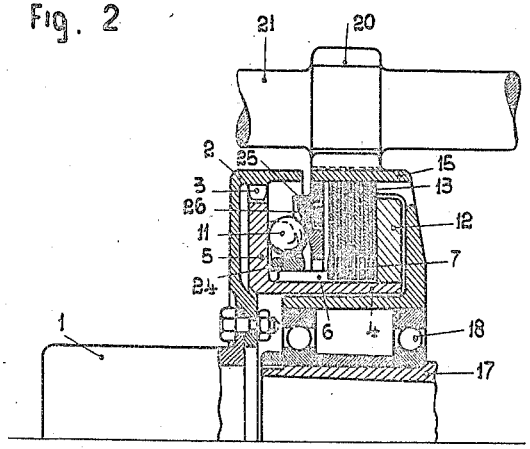

Figure 1 is an axial section thereof.
Figure 2 is a partial axial section of a modified construction.

Referring to Figure 1, 1 denotes the engine crankshaft, 2 is a disc fixed to the flanged end of the crankshaft 1 and provided with an internal set of teeth 3 by means of which it carries along in rotation the driving member of a friction clutch comprising a disc 4 having a flange 5 and longitudinal peripheral keys 6 engaged in the known manner by the friction discs 7, pressure disc 8 and a rim 9 provided with radial ribs 10 forming recesses in which the balls 11 are lodged. A bearing disc 12 is fixed to the end of the drum 4 opposite the flange 5, the friction discs being pressed against the disc 12 when the coupling is effected.

Discs 13 similar to the friction discs 7 are interposed between these latter and are slidably keyed on inner longitudinal keys 14 of the driven member 15 having a hub 16 fitted in the drum 4 and supported by a fixed tubular member 17 with the interposition of ball bearings 18.

The driven member 15 carries an external set of teeth 19 meshing with a pinion 20 keyed on the compresser shaft 21.

Springs 22 arranged between the drum 2 and the flange 5 serve to hold the member 5 slightly pressed against the drum 16 in order to prevent transverse oscillations on the member 5, while springs 23 apply an initial predetermined load on the clutch.

The working is as follows: When the engine is started, the driving drum 4 under the slight load due to the springs 23 tends to carry along in rotation the driven member. As the speed increases the coupling under the action of the centrifugal force acting on the balls is gradually tightened proportionally to the load, so as to ensure an effective coupling of the driven and driving members. Sharp speed changes cannot objectionably affect the coupling members, since the tightening of the clutch varies automatically and instantaneously with the change of the centrifugal force so that any excessive friction and heating of the friction surfaces is avoided.

In the construction described above the balls 11 during their radial displacement remain always in the same zone of the sliding surfaces as the members 5, 8 and 9 are positively connected in rotation.

After a long time of use the balls might dig hollows in said portions of the sliding surfaces preventing the working of the clutch.

In the modified construction shown in Fig. 2 this drawback is obviated. The balls 11 are carried by a ring 24 loosely mounted on the drum 4 and the pressure disc 25 is keyed on the driven drum, so that relative rotary motions can take place between the members 5, 24 and 25. The balls 11 are thus subjected at the start to a rolling motion along the sliding surfaces of the members 5 and 25, thus continuously varying the points of contact with said sliding surfaces. The initial load on the joint is applied by the springs 26 in such manner as to permit rolling of the balls when motion begins.

What I claim is:

1. Friction clutch comprising, in combination, a driving drum provided with a flange, a driven drum arranged concentrically about the driving drum, slidable friction discs alternatively keyed on said driving and driven drums, a slidable pressure disc acting on said friction discs, said pressure disc having its outer face conically recessed and being keyed on the driven drum, a ring loosely mounted between said pressure disc and the flange of the driving drum, said ring having notches on its outer periphery, balls in said notches and spring members for producing a slight pressure between the friction discs and for pressing the balls between the flange of the driving drum and the pressure disc.

2. Friction clutch comprising, in combination, a driving drum provided with a flange, a driven drum arranged concentrically about the driving drum, slidable friction discs alternatively keyed on said driving and driven drums, a slidable pressure disc acting on said friction discs, said pressure disc having its outer face conically recessed and being keyed on the driven drum, a ring loosely mounted between said pressure disc and the flange of the driving drum, said ring having notches on its outer periphery, balls in said notches and spring members for producing a slight pressure between the friction discs and for pressing the balls between the flange of the driving drum and the pressure disc, a set of teeth on the outer periphery of the driven drum, a shaft and a pinion on said shaft meshing with said set of teeth.

In testimony whereof, I hereunto affix my signature.

GUGLIELMO PIRINOLI.